United States Patent Office 3,012,982
Patented Dec. 12, 1961

3,012,982
VULCANIZABLE ORGANOPOLYSILOXANE COMPOSITIONS INCLUDING MENTHOL
Lucien Toullec, Lyon, France, assignor to Societe des Usines Chimiques Rhone-Poulenc, Paris, France, a body corporate of France
No Drawing. Filed Dec. 14, 1959, Ser. No. 859,113
Claims priority, application France Jan. 5, 1959
10 Claims. (Cl. 260—29.8)

This invention relates to organopolysiloxane compositions which are transformable into elastomers by vulcanisation, and more particularly to loaded polysiloxane gums.

It is known that silicone elastomers are obtainable by vulcanisation, for example with the aid of an organic peroxide, of mixtures consisting essentially of an organopolysiloxane of high viscosity, sometimes called gum, and various loading agents.

It is also known that the properties of the elastomers obtained depend upon the nature of the loading agents employed and upon their particle dimensions.

Many oxides and metal salts have been proposed as loading agents for reinforcing silicone elastomers; examples being titanium dioxide, iron oxide, zinc oxide, alumina, silica, calcium carbonate and various clays.

Loading agents in the form of finely divided particles, more especially certain forms of silica whose particles have a size smaller than 100 m$\mu$ and the specific surface of which is at least 20 m.$^2$ per gram, are particularly useful because they enable elastomers of excellent mechanical properties to be obtained. Such very finely divided silica is marketed under the trademarks Santocel, Hi-Sil X303 and Aerosil.

Unfortunately, the compositions obtained by mixing and kneading these loading agents with organopolysiloxanes and the vulcanising agent have the disadvantage that they tend to harden on standing for long periods.

This disadvantage can to some extent be obviated, and some plasticity can be restored to a said mixture kept for several days, by subjecting the mixture, at the time of use, to a fresh mixing and kneading operation, which is referred to herein as "mechanical plasticisation." However, the time required for this operation is considerable, so that this method of overcoming the disadvantage of hardening on storage can be regarded as loss of time and a waste of energy.

It has been found possible by incorporating certain additions to obtain mixtures of loaded polysiloxane gums which are easier to work and which regain their initial plasticity as a result of mixing and kneading for a short time.

It has been proposed to employ as additives for this purpose either certain organosilicic derivatives, for example diphenylsilanediol, or purely organic derivatives such as certain $\alpha$-glycols. Although the efficacy of the agents heretofore proposed for facilitating the mixing and kneading is generally satisfactory, it is found that the optimum additive varies in accordance with the gum and in accordance with the loading agent employed, and that in certain respects the improvements obtained are insufficient.

It has now been found that menthol acts very effectively on the plasticity of loaded siloxane gums and makes it possible to reduce considerably the necessary period of mechanical plasticisation of the stored mixtures.

It has also been found that said compositions containing methanol possess, when vulcanised, greater tearing strength and greater elongation than products to which menthol has not been added.

According to the present invention there are provided loaded polysiloxane gums capable of being rendered plastic after storage by a short period of mechanical plasticisation which comprise 100 parts by weight of an organopolysiloxane gum, 20 to 90 parts by weight of a finely divided mineral loading agent having a particle size less than 100 m$\mu$ and a specific surface area of at least 20 m.$^2$/g., and 0.1 to 10 parts by weight of menthol.

The invention further includes loaded polysiloxane gums as just set forth which further contain a vulcanising agent, e.g. an organic peroxide, in vulcanising amount.

The property possessed by menthol of maintaining the plastic state in compositions as just defined is the more remarkable in that other terpene derivatives, such as camphor, terpineol, guaiacol, isoeugenol, thymol, borneol and terpine, do not give the same result. Either the latter products do not give the desired "antistructure" effect, or, if they have such an effect, the mechanical properties of the elastomers obtained are so impaired that the use of an additive is inadvisable.

It has also been observed that the effect of the menthol is not related to the nature of the hydrocarbon group of the organopolysiloxane employed.

By the term "organopolysiloxane" used herein is meant a compound having the fundamental claim structure

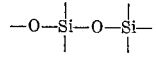

with hydrocarbon radicals satisfying the free valencies of the silicon atoms. The hydrocarbon radicals may be of various types, for example saturated or unsaturated aliphatic groups such as methyl, ethyl, butyl, cyclohexyl, vinyl or alkyl, or aromatic or halo-aromatic groups such as phenyl, chlorophenyl, or tolyl groups.

The gums of this class are the polymers of high viscosity generally above 100,000 centistokes at ordinary temperature, and these can be obtained from liquid organopolysiloxanes by various methods, e.g. condensation in the presence of ferric chloride, strong acids (e.g. sulphuric or phosphoric acid) or alkalis (e.g. sodium or potassium hydroxide). These gums contain the polysiloxane chain of the structure indicated above, the terminal groups being triorganosilyl, hydroxyl or other chain-stopping groups.

The organopolysiloxane gums employed preferably have an R:Si ratio between 1.9 and 2.1 (R representing substituent hydrocarbon groups) and preferably contain, per 100 parts by weight of gum, 45 to 75 parts by weight of the mineral loading agent of grain size and specific surface area as set forth above.

Apart from the above-defined finely divided loading agents, the compositions may also contain other fillers, for example, titanium dioxide, calcium carbonate and alumina, and other additives which have no effect on the period of plasticisation of the mixtures obtained.

The order in which the constituents of the mixture are added and their method of preparation have no material influence on the properties of the product obtained, although it is generally preferred, for reasons of convenience, to incorporate the previously crushed menthol in the gum before the loading agent or agents and the vulcanizing agent, if any, are added.

The following examples will serve to illustrate the invention. Percentages and parts given are by weight.

*Example I*

A methylvinylsiloxane gum was prepared by condensing in the presence of potassium hydroxide, octamethylcyclotetrasiloxane to which there had been added 0.08% of tetradecamethylhexasiloxane as chain limiter and 0.23% of tetramethyltetravinylcyclotetrasiloxane. The methylvinylpolysiloxane obtained was neutralised with 1% of finely divided silica and then heated to 170° C., the volatile products being entrained by a current of nitrogen. The gum obtained had a viscosity of 25 million centipoises at 25° C.

100 parts of this gum were then mixed and kneaded in a two-cylinder mixer with 47 parts of silica of combustion marketed under the trademark "Aerosil," which had been treated with an organopolysiloxane and 1.13 parts of 2:4-dichlorobenzoyl peroxide were added, followed by a further quantity of 23 parts of "Aerosil" silica. The "Aerosil" silica had a mean particle diameter of 13 m$\mu$ and a specific surface area of 300 m.$^2$/g.

Similar mixtures were prepared with gums to which 0.5%, 1%, 2%, 4% and 6%, respectively, of menthol had previously been directly added. The plastic masses thus obtained were kept at ambient temperature for 52 days before being used. At the time of use, the product was mixed and kneaded to restore an appropriate plasticity to all the mixtures, and vulcanisations were effected in a mould under a pressure of 50 kg./cm.$^2$ at 125° C. for ten minutes. Elastomer plates were thus obtained, the mechanical properties of which are hereinafter given, together with the periods of kneading and mixing.

| Properties | Menthol content | | | | | |
|---|---|---|---|---|---|---|
| | 0% | 0.5% | 1% | 2% | 4% | 6% |
| Period of plasticisation of the unvulcanised mixtures (in seconds) | 143 | 132 | 122 | 84 | 55 | 40 |
| Shore A hardness | 61 | 58 | 54 | 49 | 38 | 36 |
| Breaking elongation in percent | 392 | 468 | 464 | 712 | 964 | 1,292 |
| Breaking strength, kg./cm.$^2$ | 96.3 | 92.7 | 85.4 | 80.4 | 75.6 | 61.5 |
| Tearing strength, kg./cm. | 13.9 | 20.75 | 28.6 | 36.7 | 40 | 40 |

The above table shows the favourable influence of the addition of increasing proportions of menthol to the vulcanisable compositions on the period of plasticisation, the elongation and the tearing strength.

*Example II*

To 100 parts of organopolysiloxane gum similar to that employed in Example I were added in the two-cylinder mixer 4 parts of menthol, 55 parts of Hi-Sil X303 silica (mean particle diameter 22 m$\mu$, specific surface 160 m.$^2$/g.) and 0.75 part of 2:4-dichlorobenzoyl peroxide.

A comparison mixture without menthol was prepared at the same time and the two products were kept for 21 days.

At the end of this time, the products had hardened in different ways. In order to restore their plasticity, a mixing and kneading for 123 seconds was necessary in the case of the mass containing no menthol, and one of 82 seconds only in the case of the other mass.

The two plasticised compositions were thereafter vulcanised under the same conditions as in Example I. The tests made on specimens then gave:

In the case of the elastomer treated with menthol—
 Shore A hardness of 35
 Elongation of 880%, and
 Tearing resistance of 27.3 kg./cm.
In the case of the comparison product—
 Shore A hardness of 52
 Elongation of 370%, and
 Tearing resistance of 10.5 kg./cm.

*Example III*

A methylpolysiloxane gum was prepared from octamethylcyclotetrasiloxane and tetradecamethylhexasiloxane by a process similar to that employed in Example I. The viscosity of this gum was 24 million centipoises at 25° C.

There were incorporated in 100 parts of the gum, in the mixer, 4 parts of diphenylsilanediol (a known plasticizing agent), 70 parts of the Aerosil employed in Example I, and 2.4 parts of 2:4-dichlorobenzoyl peroxide.

Similar mixtures, but containing 1 and 2 parts of menthol in addition to the diphenylsilanediol, were prepared for comparative examination. After having been kept at ambient temperature for 52 days, the mixtures which had acquired some rigidity, were returned to the mixer and then vulcanised by heating for 10 minutes at 125° C. under a pressure of 50 kg./cm.$^2$.

The mixing periods and the mechanical properties of the elastomers obtained are given in the following table:

| Mechanical properties | Plasticising agent, 4 parts of diphenylsilanediol | | |
|---|---|---|---|
| | Without menthol. | +1 part of menthol. | +2 parts of menthol. |
| Plasticising agent content (1% in relation to the gum). | | | |
| Period of plasticisation after standing for 52 days. | 100 seconds | 89 seconds. | 78 seconds. |
| Breaking elongation in percent. | 520 | 704 | 892. |
| Breaking strength in kg./cm.$^2$ | 87.2 | 82.5 | 75. |
| Tearing strength, kg./cm. | 21.2 | 30 | 34.7. |

These results show that the effect of the menthol is added to that of the diphenylsilanediol, more especially in regard to the plasticisation period, the elongation and the tearing strength of the vulcanised elastomers.

I claim:
1. A loaded polysiloxane gum capable of being rendered plastic after storage by a short period of mechanical plasticisation which comprises 100 parts by weight of an organic polysiloxane gum which is a compound having the fundamental chain structure

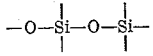

where the free valencies are connected to hydrocarbon radicals, and which has a viscosity above 100,000 centistokes at ordinary temperature, 20 to 90 parts by weight of a finely divided mineral loading agent having a particle size less than 100 m$\mu$ and a specific surface area of at least 20 m.$^2$/g., and 0.1 to 10 parts by weight of menthol.

2. A loaded polysiloxane gum capable of being rendered plastic after storage by a short period of mechanical plasticisation which comprises 100 parts by weight of an organic polysiloxane gum which is a compound having the fundamental chain structure

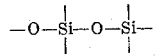

where the free valencies are connected to hydrocarbon radicals, and which has a viscosity above 100,000 centistokes at ordinary temperature of which the polysiloxane has an R:Si ratio, where R represents the hydrocarbon substituent groups present, of 1.9 to 2.1, 20 to 90 parts by weight of a finely divided mineral loading agent having a particle size less than 100 m$\mu$ and a specific surface area of at least 20 m.$^2$/g., and 0.1 to 10 parts by weight of menthol.

3. A loaded polysiloxane gum capable of being rendered plastic after storage by a short period of mechanical plasticisation which comprises 100 parts by weight of an organic polysiloxane gum which is a compound having the fundamental chain structure

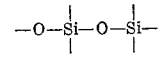

where the free valencies are connected to hydrocarbon radicals, and which has a viscosity above 100,000 centistokes at ordinary temperature, of which the polysiloxane is a methyl vinyl polysiloxane having an R:Si ratio where R represents the total of methyl and vinyl groups present, of 1.9 to 2.1, 20 to 90 parts by weight of a finely divided mineral loading agent having a particle size less than 100 m$\mu$ and a specific surface area of at least 20 m.$^2$/g., and 0.1 to 10 parts by weight of menthol.

4. A loaded polysiloxane gum capable of being rendered plastic after storage by a short period of mechanical plasticisation which comprises 100 parts by weight of an organic polysiloxane gum which is a compound having the fundamental chain structure

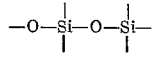

where the free valencies are connected to hydrocarbon radicals, and which has a viscosity above 100,000 centistokes at ordinary temperature of which the polysiloxane has an R:Si ratio, where R represents the hydrocarbon substituent groups present, of 1.9 to 2.1, 45 to 75 parts by weight of a finely divided mineral loading agent having a particle size less than 100 m$\mu$ and a specific surface area of at least 20 m.$^2$/g., and 0.1 to 10 parts by weight of menthol.

5. A loaded polysiloxane gum capable of being rendered plastic after storage by a short period of mechanical plasticisation which comprises 100 parts by weight of an organic polysiloxane gum which is a compound having the fundamental chain structure

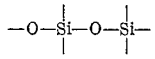

where the free valencies are connected to hydrocarbon radicals, and which has a viscosity above 100,000 centistokes at ordinary temperature, of which the polysiloxane is a methyl vinyl polysiloxane having an R:Si ratio where R represents the total of methyl and vinyl groups present, of 1.9 to 2.1, 45 to 75 parts by weight of a finely divided mineral loading agent having a particle size less than 100 m$\mu$ and a specific surface area of at least 20 m.$^2$/g., and 0.1 to 10 parts by weight of menthol.

6. A loaded polysiloxane gum capable of being rendered plastic after storage by a short period of mechanical plasticisation which comprises 100 parts by weight of an organic polysiloxane gum which is a compound having the fundamental chain structure

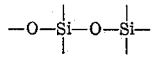

where the free valencies are connected to hydrocarbon radicals, and which has a viscosity above 100,000 centistokes at ordinary temperature, 20 to 90 parts by weight of a finely divided mineral loading agent having a particle size less than 100 m$\mu$ and a specific surface area of at least 20 m.$^2$/g., 0.1 to 10 parts by weight of menthol and a vulcanising agent.

7. A loaded polysiloxane gum capable of being rendered plastic after storage by a short period of mechanical plasticisation which comprises 100 parts by weight of an organic polysiloxane gum which is a compound having the fundamental chain structure

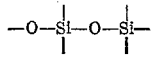

where the free valencies are connected to hydrocarbon radicals, and which has a viscosity above 100,000 centistokes at ordinary temperature of which the polysiloxane has an R:Si ratio, where R represents the hydrocarbon substitutent groups present, of 1.9 to 2.1, 45 to 75 parts by weight of a finely divided mineral loading agent having a particle size less than 100 m$\mu$ and a specific surface area of at least 20 m.$^2$/g., 0.1 to 10 parts by weight of menthol and a vulcanising agent.

8. A loaded polysiloxane gum capable of being rendered plastic after storage by a short period of mechanical plasticisation which comprises 100 parts by weight of an organic polysiloxane gum which is a compound having the fundamental chain structure

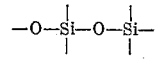

where the free valencies are connected to hydrocarbon radicals, and which has a viscosity above 100,000 centistokes at ordinary temperature, of which the polysiloxane is a methyl vinyl polysiloxane having an R:Si ratio where R represents the total of methyl and vinyl groups present, of 1.9 to 2.1, 45 to 75 parts by weight of a finely divided mineral loading agent having a particle size less than 100 m$\mu$ and a specific surface area of at least 20 m.$^2$/g., 0.1 to 10 parts by weight of menthol and a vulcanising agent.

9. A loaded polysiloxane gum capable of being rendered plastic after storage by a short period of mechanical plasticisation which comprises 100 parts by weight of an organic polysiloxane gum which is a compound having the fundamental chain structure

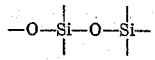

where the free valencies are connected to hydrocarbon radicals, and which has a viscosity above 100,000 centistokes at ordinary temperature, 20 to 90 parts by weight of a finely divided mineral loading agent having a particle size less than 100 m$\mu$ and a specific surface area of at least 20 m.$^2$/g., 0.1 to 10 parts by weight of menthol and an organic peroxide vulcanising agent.

10. A loaded polysiloxane gum capable of being rendered plastic after storage by a short period of mechanical plasticisation which comprises 100 parts by weight of an organic polysiloxane gum which is a compound having the fundamental chain structure

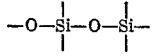

where the free valencies are connected to hydrocarbon radicals, and which has a viscosity above 100,000 centistokes at ordinary temperature, of which the polysiloxane is a methyl vinyl polysiloxane having an R:Si ratio where R represents the total of methyl and vinyl groups present, of 1.9 to 2.1, 45 to 75 parts by weight of a finely divided mineral loading agent having a particle size less than 100 m$\mu$ and a specific surface area of at least 20 m.$^2$/g., 0.1 to 10 parts by weight of menthol and an organic peroxide vulcanising agent.

References Cited in the file of this patent

UNITED STATES PATENTS 2,852,484    New    Sept. 18, 1958